No. 720,113. PATENTED FEB. 10, 1903.
J. M. COLLINS.
TREE CULTIVATOR.
APPLICATION FILED OCT. 20, 1902.
NO MODEL.
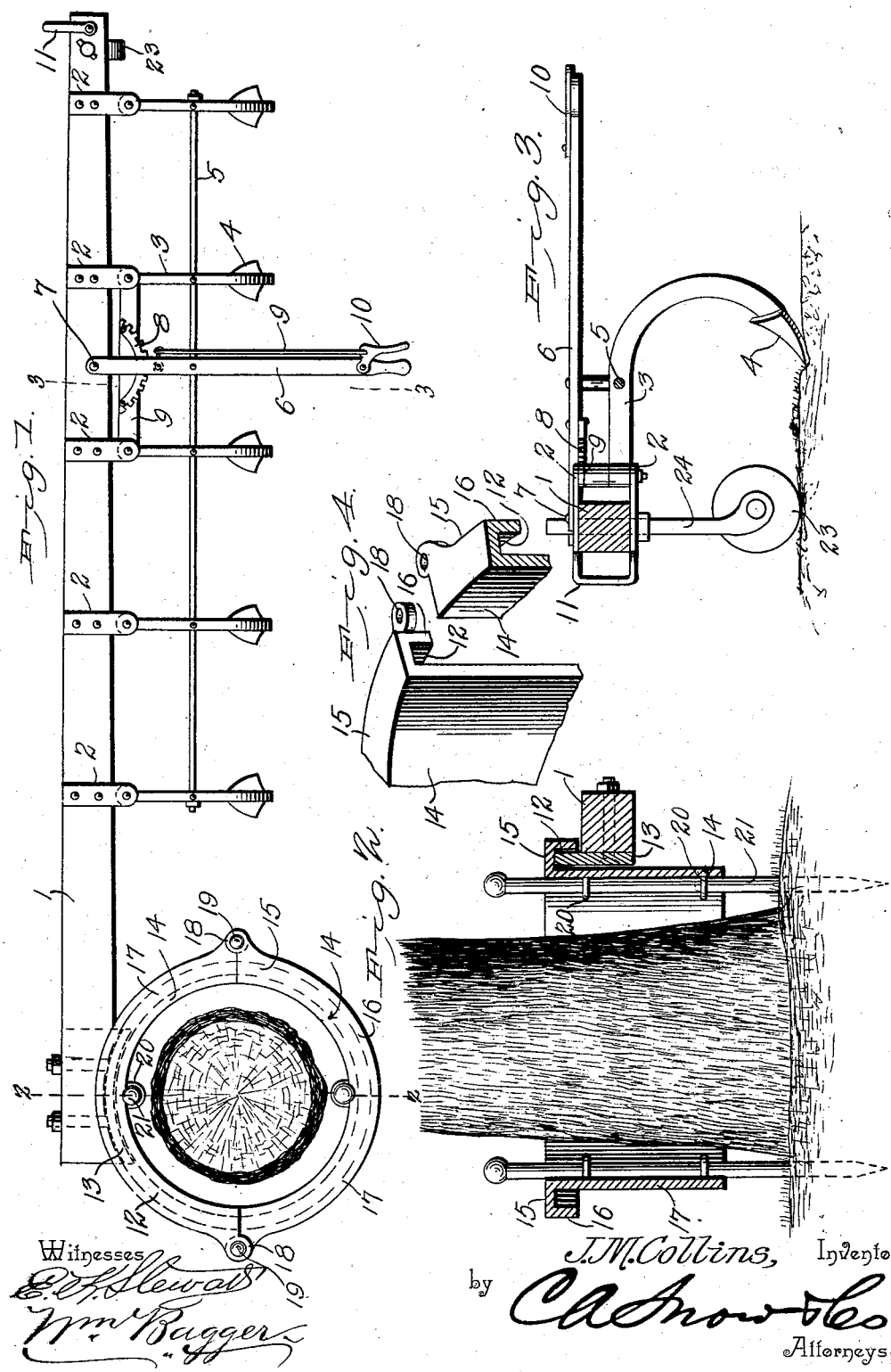
Witnesses
J. M. Collins, Inventor.
by C. A. Snow & Co.
Attorneys

UNITED STATES PATENT OFFICE.

JULIUS M. COLLINS, OF ELGIN, OKLAHOMA TERRITORY.

TREE-CULTIVATOR.

SPECIFICATION forming part of Letters Patent No. 720,113, dated February 10, 1903.

Application filed October 20, 1902. Serial No. 128,027. (No model.)

*To all whom it may concern:*

Be it known that I, JULIUS M. COLLINS, a citizen of the United States, residing at Elgin, in the county of Comanche and Territory of Oklahoma, have invented a new and useful Tree-Cultivator, of which the following is a specification.

This invention relates to an improved device for the purpose of cultivating the soil around and adjacent to trees where proper cultivation is either difficult or impossible when cultivating instruments of ordinary construction are used, owing to the difficulty of stirring the soil sufficiently close to the trunk of the tree without danger of injuring the roots or barking the trees.

My invention has for its object to provide a device by means of which the soil adjacent to fruit and other trees may be thoroughly and efficiently tilled and which said device shall possess superior advantages in point of simplicity, durability, and general efficiency; and with these ends in view the invention consists in the improved construction, arrangement, and combination of parts, which will be hereinafter described, and particularly pointed out in the claims.

In the accompanying drawings, Figure 1 is a plan view showing my invention applied in position for operation to a tree, the trunk of which is shown in horizontal section. Fig. 2 is a vertical sectional elevation on the line 2 2 in Fig. 1. Fig. 3 is a vertical sectional view taken on the line 3 3, Fig. 1. Fig. 4 is a perspective detail view to illustrate the construction of the hinged band or collar which forms a part of my invention.

Corresponding parts in the several views are indicated by similar numerals of reference.

The beam 1 of my improved cultivator is provided with a plurality of clips or plates 2, at the rear ends of which the cultivator-standards 3 are hingedly mounted, so as to be capable of swinging in a horizontal plane. These standards, which are of ordinary construction and which carry the blades or shovels 4, are connected by means of a pivoted connecting-rod 5, which also has pivotal connection with a lever 6, fulcrumed to the beam 1, as at 7. A suitable rack-segment 8 is mounted upon a cross-bar 9, which connects two of the clips 2, and said rack-segment is engaged in the usual manner by a dog or pawl operated by means of a connecting-rod 9 and handpiece 10. By this construction the cultivator-standards may be set at various angles to the beam, as will be readily understood. The beam 1 is provided at its outer end with a draft-clevis 11, and at its inner end, whereby is meant the end that engages the guiding-collar, which is to be hereinafter described, it has a curved recess 12, in which is seated a correspondingly-curved plate 13, which projects above the upper face of the beam.

14 designates a band or collar which is provided at its upper edge with an annular outwardly-extending flange 15, having a downturned rim 16, which is adapted to be engaged by the plate 13 of the beam, which extends upwardly into the recess formed at the upper edge of the collar by the said flange and rim. The band or collar 14 is composed of two parts or sections 17, each of which is provided with perforated lugs 18, of which one is adapted to overlap the other, so that by the said lugs the sections 17 may be connected by means of pins or bolts 19, one of which may be permanent, so as to establish a permanent hinge connection between the parts or sections. This is obviously necessary in order to enable the band or collar to be adjusted in operative position around the trunk of a tree, as shown in Fig. 2 of the drawings. Each of the sections 17 is provided on its inner side with loops or staples 20, adapted to receive stakes 21, which when driven into the ground will support the band or collar in operative position, as will be readily understood. It is the intention that there should be furnished with each "outfit" at least two of these bands or collars, with the stakes belonging thereto, in order that while one is being used another may be placed upon the next tree, so as to be ready in position for operation. A simple provision of this kind will enable much valuable time to be saved.

The cultivator-beam 1 is provided at its outer end with an idle wheel or supporting-wheel 23, which may, as shown in the drawings, be mounted at the lower forked end of the bracket or standard 24, suitably connected with the beam. Said bracket or standard will be preferably mounted pivotally, so that the wheel 23 will turn as a caster. This attachment will greatly facilitate the transportation of the device from one tree to another. In place of a wheel a slide or sled-shoe might be used, as will be readily understood, the result accomplished being the same.

In operation after adjusting the band or collar in operative position, as shown in Figs. 2 and 3 of the drawings, the plate 13 is hooked into the recess formed at the upper edge of said band by the flange 15 and rim 16, and draft being applied to the outer end of the beam the cultivator will speedily make the circuit of the tree, thus tilling the soil in precisely the place where it needs to be done. When more than one circuit is made, the position of the cultivator-standards may be changed so that each blade shall dig two or more furrows, according to the number of circuits made. The means provided for the adjustment of the cultivators also enable the latter to be set so as to avoid injury to the roots of the tree. The bark of the latter is thoroughly protected by the encircling band or collar 14.

The simplicity of my improved device, the facility with which it may be adjusted and operated, and the efficiency of its work will commend it to the owners of large orchards where the value of the output depends largely upon the thorough cultivation of the ground.

I desire it to be understood that I do not limit myself to the precise structural details herein described, but reserve the right to any changes and modifications which may be resorted to without departing from the spirit and scope of my invention or detracting from the utility of the same.

Having thus fully described the invention, I claim—

1. In a device of the class described, a protecting band or collar having at its upper edge an annular flange provided with a depending rim forming a recess, means for mounting said collar in operative position, and a cultivator-beam provided with an upwardly-extending plate seated in a concavity at the inner end of said beam.

2. In a device of the class described, a protecting band or collar comprising two members suitably connected and provided at its upper edge with a laterally-extending flange having a downwardly-extending rim forming a recess, means for mounting and supporting said collar in operative position, a beam provided with an upwardly-extending plate seated in a concavity at the inner end of said beam, a plurality of cultivators hingedly connected with said beam, pivotal connecting means for said cultivators, and means for retaining the latter at the desired point of adjustment.

3. In a device of the class described, a cultivator-beam having engaging means at one end and a draft-clevis at the other end thereof, a plurality of cultivator-standards hingedly connected with said beam, a connecting-rod pivotally connecting said standards, and an adjusting-lever fulcrumed upon the beam, pivotally connected with the connecting-rod and retaining means for said adjusting-lever.

4. In a device of the class described, a cultivator-beam having engaging means at one end and a draft-clevis at the other end thereof, a plurality of cultivators hingedly connected with said beam, means for adjusting and retaining said cultivators, and a carrying-wheel at the outer end of said cultivator-beam.

5. A device for cultivating around trees, comprising a collar surrounding the tree and provided at its upper edge with an annular flange having a depending rim forming a recess, supporting means for said collar, a cultivator-beam having means to engage the recess upon said collar, a plurality of cultivators hingedly connected with said beams, means for adjusting said cultivators and for locking them at the desired adjustment, a draft-clevis, and supporting means at the outer end of said cultivator-beam.

In testimony that I claim the foregoing as my own I have hereto affixed my signature in the presence of two witnesses.

JULIUS M. COLLINS.

Witnesses:
N. M. BRUCE,
H. C. CASH.